3,189,491
ALUMINUM FLUX
Frank E. Robbins, Midland, Mich., assignor to The Dow Chemical Company, Midland, Mich., a corporation of Delaware
No Drawing. Filed July 2, 1962, Ser. No. 207,065
8 Claims. (Cl. 148—26)

This invention relates to a novel flux for use with aluminum. More particularly, this invention relates to a flux composition containing inorganic halide salts.

When aluminum is melted in the presence of air, as in making aluminum alloys or preparing a melt for casting, a number of problems are usually encountered. Among these problems are dross and slag formation which may cause a build up on the melt vessel walls with a consequent reduction in heat transfer, and a general contamination of the metal product. A problem related to the dross and slag formation is that of metal loss. A certain amount of the aluminum alloy is usually consumed in the formation of dross and slag. Fluxes are sometimes used in the melting of aluminum in an attempt to alleviate some of these problems.

Fluxes commonly employed in melting aluminum have the disadvantage of becoming dried out and solid when extended melt periods are used.

It is an object of this invention to provide a novel flux which will aid in preventing dross and slag formation.

It is another object of this invention to provide a novel flux having good heat transfer properties.

It is a further object of the present invention to provide a novel flux which will help to prevent the deterioration of melt vessel linings.

It is a still further object of this invention to provide a flux which will stay liquid at aluminum melt temperatures for extended periods of time.

The objects of the present invention may be accomplished by the use of a mixture of inorganic halide salts as a melting flux with aluminum.

As used herein, the term "aluminum" means aluminum or aluminum alloy containing at least seventy percent aluminum.

Fluxes useful in accordance with the present invention contain from about twenty to about thirty-five percent by weight sodium chloride, from about fifty to about seventy percent by weight calcium chloride, from about four to about ten percent by weight barium chloride, and from about three to about ten percent by weight calcium fluoride.

Preferred fluxes of the present invention contain from about twenty-three to about thirty percent by weight sodium chloride, from about fifty-five to about sixty-eight percent by weight calcium chloride, from about five to about eight percent by weight barium chloride, and from about four to about seven percent by weight calcium fluoride.

Specific combinations of the inorganic halide salts within the ranges above specified are generally to be determined by the desired flux melting point. It is desirable that the flux melt at about or slightly below the melting point of the aluminum to be melted. If the flux remains in a solid or granular state after the metal melts, the probability of oxidation of at least a portion of the molten metal is high.

The flux compositions of the present invention are useful over a range of temperatures from about the melting point of the specific combination used to very high temperatures, sometimes as high as 1800 degrees Fahrenheit, if desired.

Flux combinations of the present invention have a further advantage in that not only do they help prevent dross and slag formation, but they also aid in dissolving and removing old deposits of dross and slag which may have accumulated on the interior surface of the melt vessel. Because of the dark color of these fluxes, heat transfer in refractory type furnaces is greatly enhanced.

Uses contemplated for the fluxes of the present invention with aluminum include, but are not limited to, foundry melting, secondary smelting, primary alloying and the like.

A typical charge to a melt vessel will usually contain from about two to about thirty percent by weight flux material and from about ninety-eight to about seventy percent by weight of the aluminum containing material to be melted. More or less flux may be used depending on the dictates of practice with the particular aluminum, the type of furnace, the shape of the melt vessel, the amount of impurities, the operating temperature to be used, and other like considerations involved in the metal melting art.

Fluxes of the present invention may be prepared as by blending solid inorganic halide salts in the desired combination. Another method of preparation is by fusing the desired combination of inorganic halide salts and grinding the fused mass to a desirable particle size. The latter method is generally to be preferred, particularly in situations where the flux melting point may be critical, and the presence of air borne fines is objectionable.

Flux compositions of the present invention are somewhat hygroscopic so that unless protected from the atmosphere they will usually acquire and retain water. Thus, it may be readily seen that care should be taken to store the fluxes of the present invention in such a manner that they will remain dry.

The present invention may be better understood in light of the following examples which are set forth to illustrate, but are not to be construed to limit, this invention.

*Example 1*

A melt which was prepared by mixing two hundred thirty-one pounds of 5056 aluminum having the nominal composition of 5.2 percent magnesium, 0.1 percent manganese, 0.1 percent chromium, the balance aluminum, in the form of medium sized chips, with thirty three pounds of a fused flux containing twenty-eight percent sodium chloride, fifty-seven percent calcium chloride, eight percent barium chloride and seven percent calcium fluoride. The resulting mixture was charged to a reverbratory furnace and heated to about 1350 degrees Fahrenheit. The charge was maintained at about this temperature until melting was complete. During the melt is was observed that molten flux covered the entire surface of the molten aluminum.

After complete melting was attained the molten flux and aluminum were poured from the melt vessel into an appropriate receptacle. Inspection of the melt vessel after pouring indicated that there was no observable new accumulation of dross and slag. Further, the residual dross and slag from previous melts, using other fluxes, which had coated the walls of the vessel to some extent, was observed to have been softened and at least partially removed.

Calculations made after pouring showed a flux consumption of about 14.3 percent and the metal loss of about 11.3 percent by weight of metal charged.

*Example 2*

A charge was prepared by mixing seventy-five pounds of 5083 aluminum having a nominal composition of 4.5 percent magnesium, 0.7 percent manganese and the balance aluminum, in the form of fine ribbon like shavings, with eighteen pounds of flux containing twenty-eight percent sodium chloride, fifty-seven percent calcium chloride, eight percent barium chloride, and seven percent calcium fluoride. The resulting mixture was charged to a reverbratory furnace and heated to about 1350 degrees Fahrenheit. The charge was maintained at about this temperature for a period of approximately two and a half hours. During this time, more aluminum-flux charge mixture was added to the melt already in the furnace. Charging was accomplished in this manner because of volume considerations. The charge mixture, in its finely divided solid state occupies many times the volume of a corresponding melt. Thus, in order to get a full melt, it was necessary to position within the melt vessel, in successive stages, several vessels full of charge mixture. When complete melting was accomplished the molten flux and aluminum were poured into an appropriate receptacle. Inspection of the melt vessel after pouring indicated that there had been no objectionable new accumulation of dross and slag. Residual dross and slag from previous melts, made using other fluxes, which had coated the vessel walls to some degree, was observed to have been softened and at least partially removed.

Calculations made after pouring showed a flux consumption of about twenty four percent and metal loss of about thirteen percent by weight of metal charged.

*Example 3*

A charge was prepared by mixing two hundred thirteen pounds of 5083 aluminum having a nominal composition of 4.5 percent magnesium, 0.7 percent manganese and the balance aluminum, in the form of heavy chips, with twenty-five pounds of solid fused flux containing twenty-three percent sodium chloride, sixty-eight percent calcium chloride, five percent barium chloride, and four percent calcium fluoride. The resulting mixture was charged to a reverbaratory furnace and maintained at about 1350 degrees Fahrenheit. Charging was accomplished stepwise, as outlined in Example 2, over a period of about five hours.

When melting was complete the molten flux and aluminum were poured into an appropriate receptacle. Inspection of the melt vessel indicated results comparable to those described in Examples 1 and 2.

Calculations made after pouring showed a flux consumption of about twelve percent and a metal loss of about thirteen percent by weight of metal charged.

*Example 4*

Using substantially the same techniques and method employed in Examples 1, 2 and 3, a wide variety of flux compositions may be used with similar results. Sodium chloride may range from about twenty to about thirty-five percent, calcium chloride may range from about fifty to about seventy percent, barium chloride may range from about four to about ten percent, and calcium fluoride may range from about three to about ten percent. These flux compositions may be used with aluminum and aluminum alloys containing at least 70 percent aluminum.

*Example 5*

Tests were run in order to determine molten flux life. In one such test, four hundred pounds of commercial aluminum were melted in a reverbratory furnace, and maintained at about 1450 degrees Fahrenheit. The surface of the molten aluminum was covered with a flux containing twenty-three percent sodium chloride, sixty-eight percent calcium chloride, five percent barium chloride, and four percent calcium fluoride.

The flux became molten very quickly and flowed over the entire surface of molten metal. Even the downward curve of the meniscus was covered with liquid flux up to the vessel wall. After more than sixteen hours at the melt temperature, the flux was still soft and pliable. Accumulated dross and slag on the refractory walls had been softened and was easily removed. Protection afforded by the flux was such that after several days at melt temperature no siginficant build-up of slag had occurred at the metal surface, nor was there evidence of molten salt or sludge below the molten metal.

Various modifications may be made in the present invention without departing from the spirit or scope thereof, and it is to be understood that I limit myself only as defined in the appended claims.

I claim:

1. A flux composition for use in melting aluminum and aluminum alloys containing at least 70 percent aluminum in a melt vessel, said flux composition consisting essentially of from about twenty to about thirty-five percent sodium chloride, from about fifty to about seventy percent calcium chloride, from about four to about ten percent barium chloride, and from about three to about ten percent calcium fluoride.

2. A flux composition for use in melting aluminum and aluminum alloys containing at least 70 percent aluminum in a melt vessel, said flux composition consisting essentially of twenty-three percent sodium chloride, sixty-eight percent calcium chloride, five percent barium chloride, and four percent calcium fluoride.

3. A flux composition for use in melting aluminum and aluminum alloys containing at least 70 percent aluminum in a melt vessel, said flux composition consisting essentially of twenty-eight percent sodium chloride, fifty-seven percent calcium chloride, eight percent barium chloride, and seven percent calcium fluoride.

4. A flux composition for use in melting aluminum and aluminum alloys containing at least 70 percent aluminum in a melt vessel, said flux composition consisting essentially of from about 23 to about 30 percent sodium chloride, from about 55 to about 68 percent calcium chloride, from about 5 to about 8 percent barium chloride, and from about 4 to about 7 percent calcium fluoride.

5. In a method of melting aluminum and aluminum alloys containing at least 70 percent aluminum in a melt vessel, the improvement which consists in providing a flux composition consisting essentially of from about 20 to about 35 percent sodium chloride, from about 50 to about 70 percent calcium chloride, from about 4 to about 10 percent barium chloride, and from about 3 to about 10 percent calcium fluoride, adding said flux composition to the melt, and maintaining a molten layer of said flux composition in contact with the molten metal, thereby to substantially prevent formation of dross and slag.

6. In a method of melting aluminum and aluminum alloys containing at least 70 percent aluminum in a melt vessel, the improvement which consists in providing a flux composition consisting essentially of from about 23 to about 30 percent sodium chloride, from about 55 to about 68 percent calcium chloride, from about 5 to about 8 percent barium chloride, and from about 4 to about 10 percent calcium fluoride, adding said flux composition to the melt, and maintaining a molten layer of said flux composition in contact with the molten metal, thereby to substantially prevent formation of dross and slag.

7. In a method of melting aluminum and aluminum alloys containing at least 70 percent aluminum in a melt vessel, the improvement which consists in providing a flux composition consisting essentially of 23 percent sodium chloride, 68 percent calcium chloride, 5 percent barium chloride, and 4 percent calcium fluoride, adding said flux composition to the melt, and maintaining a molten layer of said flux composition in contact with the molten metal, thereby to substantially prevent formation of dross and slag.

8. In a method of melting aluminum and aluminum alloys containing at least 70 percent aluminum in a melt vessel, the improvement which consists in providing a flux composition consisting essentially of 28 percent sodium chloride, 57 percent calcium chloride, 8 percent barium chloride, and 7 percent calcium fluoride, adding said flux composition to the melt, and maintaining a molten layer of said flux composition in contact with the molten metal, thereby to substantially prevent formation of dross and slag.

References Cited by the Examiner

UNITED STATES PATENTS

| | | | |
|---|---|---|---|
| 2,170,863 | 8/39 | Junker et al. | 75—93 |
| 2,327,065 | 8/43 | Reimers | 148—26 |

FOREIGN PATENTS 560,636　4/44　Great Britain.

DAVID L. RECK, *Primary Examiner.*

WINSTON A. DOUGLAS, *Examiner.*